US008032528B2

(12) United States Patent
Donovan et al.

(10) Patent No.: US 8,032,528 B2
(45) Date of Patent: Oct. 4, 2011

(54) METHOD AND SYSTEM FOR MANAGING CONTENT SUBMISSION AND PUBLICATION OF CONTENT

(75) Inventors: Kevin R J B Donovan, White Plains, NY (US); Jonathan Matthew Durr, Newfoundland, NJ (US); James Keith Toothman, Oak Ridge, NJ (US)

(73) Assignee: About Inc., New York, NY (US)

( * ) Notice: Subject to any disclaimer, the term of this patent is extended or adjusted under 35 U.S.C. 154(b) by 274 days.

(21) Appl. No.: 11/622,940

(22) Filed: Jan. 12, 2007

(65) Prior Publication Data
US 2008/0172446 A1    Jul. 17, 2008

(51) Int. Cl.
G06F 7/00       (2006.01)
G06F 17/30      (2006.01)
G06F 15/16      (2006.01)
G06F 12/00      (2006.01)

(52) U.S. Cl. .................. 707/736; 707/939; 709/246
(58) Field of Classification Search .............. 707/736, 707/939, 609; 709/202, 218–219, 224, 227, 709/246; 713/170
See application file for complete search history.

(56) References Cited

U.S. PATENT DOCUMENTS

| | | | |
|---|---|---|---|
| 5,019,961 A | 5/1991 | Addesso et al. | |
| 5,088,052 A | 2/1992 | Spielman et al. | |
| 5,347,632 A | 9/1994 | Filepp et al. | |
| 5,359,508 A | 10/1994 | Rossides | |
| 5,361,393 A | 11/1994 | Rossillo | |
| 5,442,771 A | 8/1995 | Filepp et al. | |
| 5,572,643 A * | 11/1996 | Judson | 709/218 |
| 5,712,979 A | 1/1998 | Graber et al. | |
| 5,717,860 A | 2/1998 | Graber et al. | |
| 5,778,368 A | 7/1998 | Hogan et al. | |
| 5,787,450 A | 7/1998 | Diedrich et al. | |
| 5,790,785 A | 8/1998 | Klug et al. | |
| 5,802,518 A | 9/1998 | Karaev et al. | |
| 5,812,769 A | 9/1998 | Graber et al. | |
| 5,819,271 A | 10/1998 | Mahoney et al. | |
| 5,819,285 A | 10/1998 | Damico et al. | |
| 5,835,712 A | 11/1998 | DuFresne | |
| 5,864,871 A * | 1/1999 | Kitain et al. | 707/104.1 |
| 5,897,622 A | 4/1999 | Blinn et al. | |

(Continued)

FOREIGN PATENT DOCUMENTS

EP    1 041 493    10/2000

(Continued)

OTHER PUBLICATIONS

Bernes-Lee, T., "Hypertext Transfer Protocol—HTTP/1.0"; University of California, Irvine; http://www.ics.uci.edu/pub/ietf/http/rfc1945.html; May 1996.

(Continued)

*Primary Examiner* — Greta Robinson
*Assistant Examiner* — Brian E Weinrich
(74) *Attorney, Agent, or Firm* — Hunton & Williams LLP

(57) ABSTRACT

A system and method may include assigning a review request to a queue based on a content subject matter category of content, the review request requesting review of the content, and generating a notification message indicating that the review request is pending in the queue. The system and method may further include providing access to the content via a network for review, processing a response message to the notification message, and determining whether to publish the content based on the response message.

29 Claims, 4 Drawing Sheets

U.S. PATENT DOCUMENTS

| | | | |
|---|---|---|---|
| 5,918,010 | A | 6/1999 | Appleman et al. |
| 5,933,811 | A | 8/1999 | Angles et al. |
| 5,960,429 | A | 9/1999 | Peercy et al. |
| 5,963,924 | A | 10/1999 | Williams et al. |
| 6,026,474 | A | 2/2000 | Carter et al. |
| 6,044,218 | A | 3/2000 | Faustini |
| 6,052,717 | A | 4/2000 | Reynolds et al. |
| 6,643,663 | B1 * | 11/2003 | Dabney et al. ............... 707/102 |
| 7,007,232 | B1 | 2/2006 | Ross et al. |
| 7,032,030 | B1 * | 4/2006 | Codignotto ................ 709/246 |
| 2001/0047290 | A1 * | 11/2001 | Petras et al. ................. 705/10 |
| 2004/0205075 | A1 | 10/2004 | Laturner |
| 2005/0251409 | A1 * | 11/2005 | Johnson et al. ................ 705/1 |
| 2006/0155581 | A1 | 7/2006 | Eisenberger et al. |
| 2006/0229993 | A1 * | 10/2006 | Cole ............................ 705/51 |

FOREIGN PATENT DOCUMENTS

| | | |
|---|---|---|
| WO | WO 98/02087 | 1/1998 |

OTHER PUBLICATIONS

Burke, J., "Web Databases with Cold Fusion 3"; McGraw-Hill, 1997.
Dallas, A., "Using Collabra Share 2," Que, 1995.
Graves, S., "FrontPage 97 Web Sites," The Coriolis Group, Inc., 1997.
"HTML," w3, http://www.w3.org/History/19921103...t/.hypertext/WWW/MarkUp/MarkUp.html.
"HTML Quick Reference," The University of Kansas, http://www.cc.ukans.edu/~acs/docs/other/HTML_quick.shtml.
"HTML Reference Manual," Sandia National Laboratories, http://www.sandia.gov/sci_compute/html_ref.html; Jan. 2, 1996.
Miller, K., et al., "Inside Microsoft Visual InterDev," Microsoft Press, 1997.
Kurnit's Startup: Mining for Ad Deals and Intrigue, by Robert Silverman, dated Feb. 12-25, 1997.
About.com—Our Story: http://ourstory.com/index.htm?COB=home&PID, 1999.
LookSmart's Beseen: http://www.beseen.com, 1999.
Yahoo! GeoCities—Yosemite; http://www.geocities.com/Yosemite, 1994-99.
GeoCities—Pages That Pay—About PTP; http://geocities.yahoo.com/pagesthatpay/ptp_overview.htm, 1994-99.
Document Count Them In; http://proquest.umi.com/pqdweb?TS=...&Sid=3&Idx=28&Deli=1&RQT=309&D.
A Beginner's Guide to HTML, NCSA, ncsa.uiuc.edu, revised Apr. 96, edits: Jul. 1996; Sep. 1996; Jan. 1997.
Shelton, D., Yahoo goes local with Bay Area guide, Jun. 24, 1996, CNET.com—News—Entertainment & Media; http://news.cnet.com/news/0-1005-200-311623.html.
Yahoo Scores Big-Name Financing, Nov. 29, 1995, CNET.com—News-Communications—YahooScores Big-Name Financing, http://news.cnet.com/news/0-1004-200-310097.html?tag=.
Aguilar, R., Yahoo loves New York, Sep. 8, 1996, CNET.com—News—Enterprise Computing—Yahoo loves New York, http://aolcom.cnet.com/news/0-1003-200-312489.html.
Notification of Transmittal of the International Search Report and the Written Opinion of the International Searching Authority, or the Declaration, dated Jun. 2, 2008.
Supplementary European Search Report for European Application No. 07 86 9136.7 dated Mar. 17, 2011.

* cited by examiner

300

Content Title Field 302

Brief Summary Field 304

Content Classification Field 306

Suggested Search Terms Field 308

Content Location Field 310

Submitter Information Field 312

Collaboration Request Field 314

Upload Field 316

FIG. 3

METHOD AND SYSTEM FOR MANAGING CONTENT SUBMISSION AND PUBLICATION OF CONTENT

FIELD OF THE INVENTION

The present invention generally relates to managing content submission, and more specifically to managing content submission and publication of content.

BACKGROUND OF THE INVENTION

The world wide web and the Internet have created a forum that provides a very low cost way to publish information, views, and opinion. This inexpensive way to publish information has resulted in an explosion in the amount of data available on the web. The success of the web, however, has created problems of determining how to separate informed views and authoritative information from uninformed views and unreliable information.

SUMMARY OF THE INVENTION

A method according to exemplary embodiments of the present invention may include assigning a review request to a queue based on a content subject matter category of content, the review request requesting review of the content, and generating a notification message indicating that the review request is pending in the queue. The method also may include providing access to the content via a network for review, processing a response message to the notification message, and determining whether to publish the content based on the response message.

Another method according to exemplary embodiments of the present invention may include processing content received via a network, identifying a content type and a content subject matter category of the content, and validating the content based on content rules associated with the content type. The method also may include determining whether to assign the content to a queue to request review of the content or to publish the content without review based on the content subject matter category.

A system according to exemplary embodiments of the present invention may include a first computing device communicatively coupled to a network, the first computing device communicating content via the network, a server communicatively coupled to the network, the server receiving the content communicated via the network, identifying a content subject matter category of the content, assigning the content to a queue based on the content subject matter category, and generating and transmitting a notification message via the network, and a second computing device communicatively coupled to the network, the second computing device receiving the notification message via the network, accessing the content via the network for review, and transmitting a response message to the notification message via the network, wherein the server determines whether to publish the content based on the response message.

Another system according to exemplary embodiments of the present invention may include means for assigning a review request to a queue based on a content subject matter category of content, the review request requesting review of the content, means for generating a notification message indicating that the review request is pending in the queue, means for providing access to the content via a network for review, means for processing a response message to the notification message, and means for determining whether to publish the content based on the response message.

A further system may include a communication module for communicating via a network, the communication module receiving content and content description data via the network, an authentication module communicatively coupled to the communication module, the authentication module to query the communication module to determine whether the communication module received authentication information via the network, and validation module communicatively coupled to the communication module, the validation module to process the content and the content description data to identify a content type and content rules associated with the content type, and to determine whether the content and the content description data are valid based on the content rules.

These and other features and advantages of the present invention will be apparent from the description of exemplary embodiments provided herein.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which:

FIG. 3 illustrates an exemplary upload webpage for presentation to a submitter for uploading content to a server, according to an exemplary embodiment of the present invention.

Figure 1:
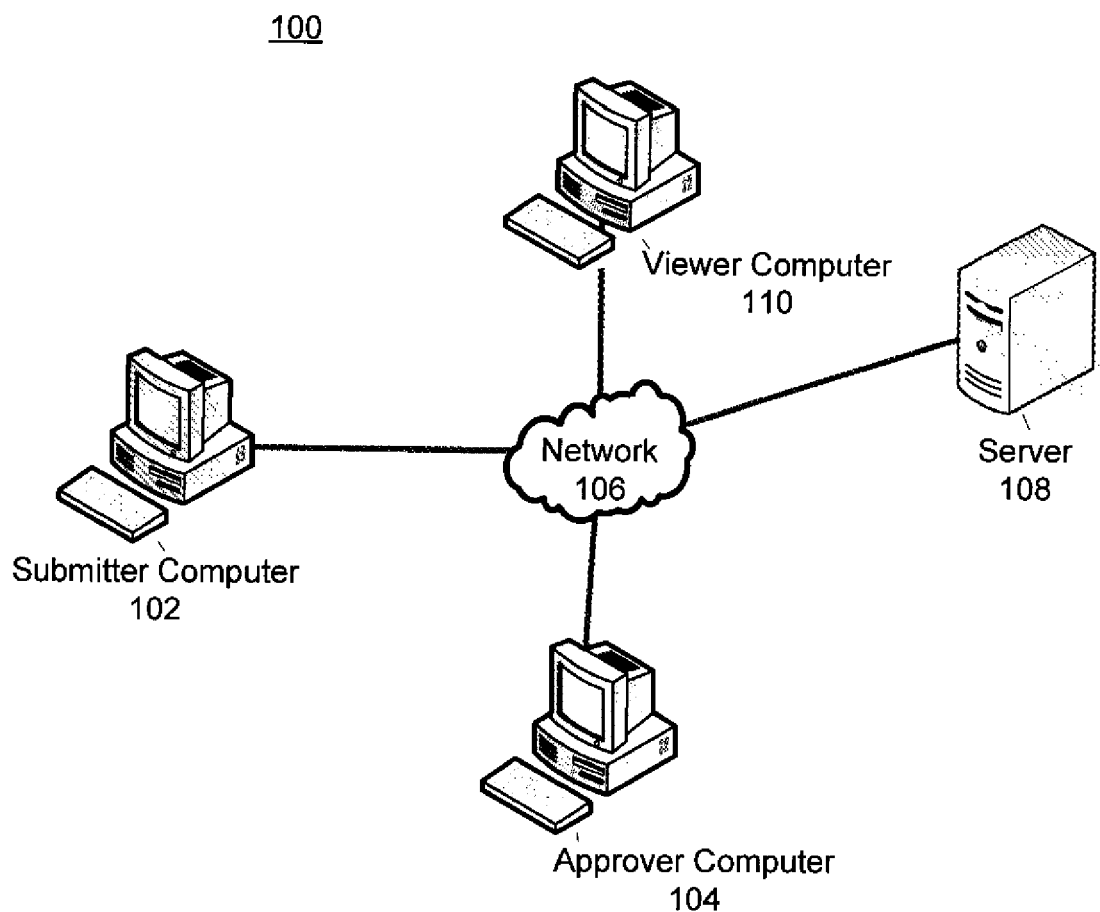
FIG. 1 illustrates an exemplary system for processing content and for determining whether to publish the content, according to an exemplary embodiment of the present invention.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

The following description is intended to convey a thorough understanding of the embodiments described by providing a number of specific embodiments and details involving methods and systems for managing content submission and publication of content. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

The description below provides a discussion of servers, computers, and other devices that may include one or more modules. As used herein, the term "module" may be understood to refer to software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the described particular module. Further, the modules may be implemented across multiple devices and/or other components local or remote to one another. Additionally, the modules may be moved from one device and added to another device, and/or may be included in both devices. Any software implementations of the present invention may be tangibly embodied in one or more storage media, such as, for example, a memory device, a floppy disk, a compact disk (CD), a digital versatile disk (DVD), or other devices that may store computer code.

The terminology used herein is for the purpose of describing particular embodiments only and is not intended to limit the scope of the present invention. As used throughout this disclosure, the singular forms "a," "an," and "the" include plural reference unless the context clearly dictates otherwise. Thus, for example, a reference to "a module" includes a plurality of such modules, as well as a single module, and equivalents thereof known to those skilled in the art.

Exemplary embodiments of the present invention provide examples of managing content submission, augmentation, and approval by geographically remote content authors, users, and content approvers. The exemplary embodiments may allow a group of one or more users to assemble and publish content. Exemplary embodiments may disclose a non-reviewed publish model and an approved publish model. The non-reviewed publish model may permit content submitters who are authenticated to publish content without further approval within certain content subject matter categories. The approved publication model may forward content received from a submitter to one or more approvers for review prior to publication. The approvers may review, modify, add to, reject the content, etc. Approved content may be published, and rejected content may not be published. Content submission and approval by approvers may increase the reliability of content published on, for example, a website, and may be used to enhance the information quality. Improved reliability may increase the value of the website to a website provider and also may translate into improved advertising opportunities for companies looking to advertise on the website that posts reliable information.

FIG. 1 illustrates a system 100 for processing content and for determining whether to publish the content, according to an exemplary embodiment of the present invention. The system 100 may include a submitter computer 102, an approver computer 104, a network 106, a server 108, and a viewer computer 110. It is noted that system 100 is a simplified system, and that various other network elements may be included. Also, it is noted that only a single submitter computer 102, a single approver computer 104, a single network 106, a single server 108, and a single viewer computer 110 are shown. The system 100, however, may include any number of these various devices.

The submitter computer 102, the approver computer 104, the server 108, and the viewer computer 110 may be computing devices capable of executing software programs in any known computer language, as are well known. The server 108 may be any known server that may communicate data to and from a network, as is well known. The submitter computer 102, the approver computer 104, and the viewer computer 110 may be, for example, desktop computers, laptop computers, notebook computers, wireless devices, mobile phones, cellular phones, Personal Digital Assistants (PDAs), other known computing devices that may communicate via a network with another computing device, and/or combinations thereof.

The network 106 may be any wired or wireless network, and/or combinations thereof, and may use known networking protocols, such as, for example, Transmission Control Protocol/Internet Protocol (TCP/IP), Asynchronous Transfer Mode (ATM), or other suitable protocols for transporting and communicating data. The network 106 may communicate information in a digital, analog, or other suitable form. The network 106 also may include various devices for translating data into one or more different formats, such as from digital to analog, for translating data from one network protocol to another, etc., as are well known. The computers 102, 104, and 110, and the server 108 may communicate messages and content over the network 106. The messages and the content may be packetized or otherwise processed for efficient transport across the network 106.

The submitter computer 102 may be associated with a user ("submitter") who desires to submit content to the server 108 for publication. The submitter also may be a company, university, or other organization. The submitter may singly submit the content or may submit multiple pieces and/or types of content in a batch process. The content may be a text document, video, audio, other information storable and retrievable from a server or other computing device, and/or combinations thereof The content may be digital, analog, etc., and/or combinations thereof For example, the submitter may desire to upload a "how-to" instructional video to the server 108 for publication of the video on a website hosted by the server 108. The instructional video may, for example, instruct viewers on how to build a deck.

After the submitter identifies the content to be uploaded, the submitter computer 102 may communicate with the server 108 over the network 106 to upload of the video. Depending on the submitter and the content, as will be discussed in detail below, the server 108 may allow the submitter to publish the content without review or may queue a review request and forward the content to an approver computer 104 for approval by a user ("approver") before publication. The approver may be an individual, group, university, government agency, some other entity having a skill or expertise in a particular field, and/or combinations thereof The approver may obtain expertise through experience, a degree, or through some other acceptable manner. The approver may review the content at the approver computer 104 based on multiple criteria to ensure that the content conforms with accepted techniques within the field of the content. For example, the submitter may submit a video on proper grooming techniques for dogs. The approver may be a licensed pet groomer, who may review the video and may determine whether the video is acceptable based on known grooming standards. The approver also may be an agent of a government agency who reviews the content for explicit or otherwise objectionable material.

After the review, the approver may transmit a response message from the approver computer 104 to the server 108 either approving or rejecting the content, as will be discussed in further detail below. Based on the response message, the server 108 may publish or prevent publishing of the content. Approved content that is published may include an approval mark indicating that the content has been reviewed by an expert and/or skilled profession in the field of the content. The approval mark may be a form of accrediting the content. The approval mark also may include a link to biographical and/or contact information on the approver. For example, the link may direct a web browser to a biography of the approver on a webpage that includes biographical information on the approver and why the approver is considered an expert within this content subject matter category.

Once published, a user ("viewer") at the viewer computer 110 may access the content from the server 108. For example, the viewer may download video content from the server 108 on pet grooming to the viewer computer 110. The viewer may see that the content includes the approval mark, which may increase the viewer's confidence that the content is reliable. The viewer also may collaborate with the submitter to suggest improvements and/or modifications to the content, as will be discussed in further detail below.

Figure 2:
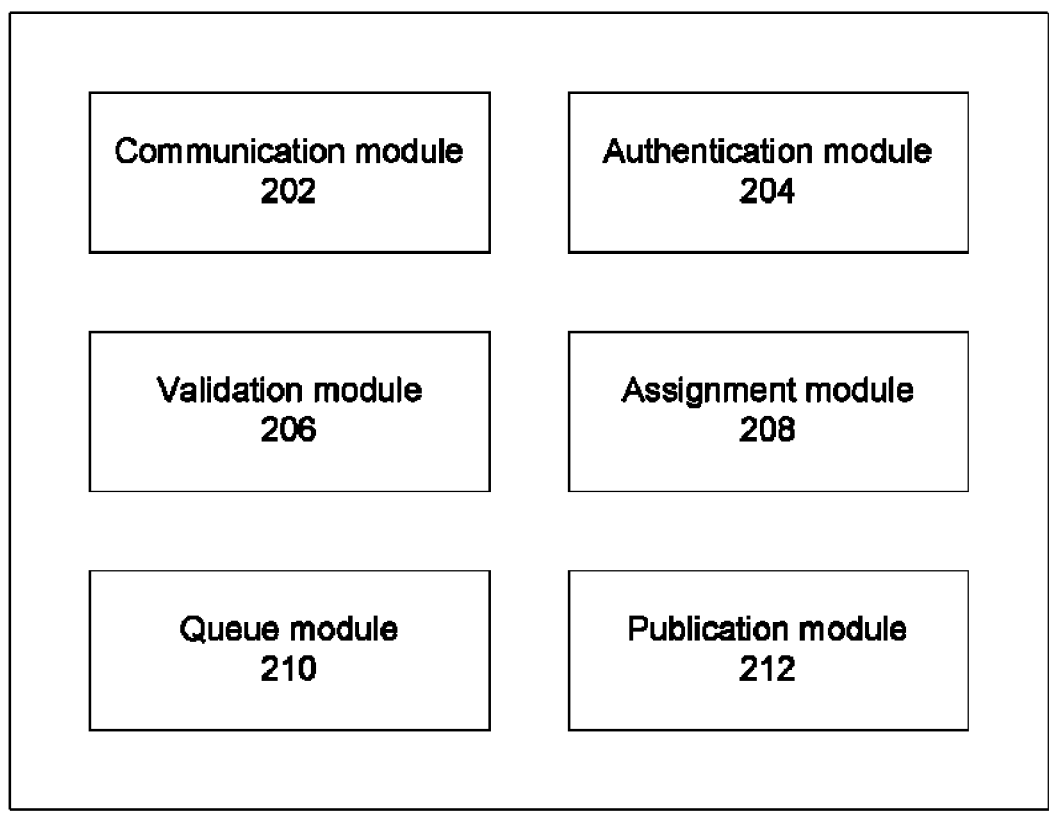
FIG. 2 illustrates exemplary modules of a server for receiving content from a submitter and for determining whether to publish the content, according to an exemplary embodiment of the present invention.

FIG. 2 includes various modules included in the server 108 for receiving content from a submitter and for determining whether to publish the content, according to an exemplary embodiment. The server 108 may include a Communication module 202, an Authentication module 204, a Validation module 206, an Assignment module 208, a Queue module 210, and a Publication module 212. It is noted that the modules 202-212 are exemplary, and the functions described as being performed at particular module may be performed at another module instead of or in addition to the function performed at the described particular module. The modules 202-212, and the functions they are described as performing, may be subdivided or combined into other modules. Other modifications to the modules 202-212 also may be made.

The Communication module 202 may receive and transmit data (e.g., content, messages, etc.) to and from the network 106. The Communication module 202 may transmit data received from the other modules 204-212 via the network 106 to the submitter computer 102, the approver computer 104, the viewer computer 110, other destination devices, and/or combinations thereof The Communication module 202 also may receive data via the network 106 from the submitter computer 102, the approver computer 104, the viewer computer 110, other source devices, and/or combinations thereof, and may forward the received data to one or more of the other modules 204-212. The Communication module 202 also may exchange data via the network 106 to establish and terminate communication sessions between one or more of the computers 102, 104, and 110. For example, the submitter computer 102 may establish a communication session with the server 108 via the Communication module 202 prior to transmitting content to the server 108. Other exemplary embodiments may not use a communication session, and instead packets, for example, containing the content may be routed over the network 106 from the submitter computer 102 to the server 108. When a user desires to upload content to, to modify content previously uploaded to, or to access content stored at the server 108, the user's computer may forward a communication request to the server 108. Upon receipt of the communication request, the Authentication module 204 of the server 108 may attempt to authenticate the user.

The Authentication module 204 may identify and authenticate the various users as being submitters, approvers, viewers, and/or combinations thereof If a user is attempting to retrieve content from the server 108 without uploading or otherwise attempting to modify published content, then the Authentication module 204 may classify the user as a viewer and may not require any authentication of the user. If the user attempts to submit content to the server 108, the Authentication module 204 may attempt to authenticate the user. The Authentication module 204 may query the Communication module 202 to determine whether authentication information has been received from the computer via the network 106. For example, the server 108 may prompt the user to enter authentication information, such as, for example, a username and password.

If the user enters authentication information, the Communication module 202 may indicate that authentication information has been received and the Authentication module 204 may indicate an authentication status of the submitter as being an authenticated submitter. If the user does not have any authentication information, the Communication module 202 may indicate that no authentication information has been received and the Authentication module 204 may indicate an authentication status of the submitter as being an unauthenticated submitter. Being an unauthenticated submitter may permit the user to submit content without being authenticated, but may subject the content to review by an approver regardless of the subject matter of the content.

If the user does not have any authentication information, but desires to obtain authentication information, then the user may register with the server 108 to obtain authentication information. Once such manner of registering a user is discussed in U.S. Pat. No. 5,918,010, issued Jun. 29, 1999, titled "Collaborative Internet Data Mining Systems," the contents of which are hereby incorporated by reference in their entirety. This patent describes a user applying to become a "Guide," and if accepted as a Guide, the Guide may submit content to a website. Other manners of screening and accepting users for submitting content to obtain authentication information also may be used.

Registering with the server 108 to obtain the authentication information may provide submitters specific access rights to specific content subject matter categories. The access rights may give the submitters the right to create and manage certain content subject matter categories (e.g., fishing techniques, city information, etc.) and content types (e.g., video, audio, text, etc.). The access rights also may define the roles of submitters in content workflow by defining what submitters can and cannot do with previously submitted content. Access rights may permit a submitter to access, create, and manage content that they have previously submitted to a particular content subject matter category. Access rights also may permit a submitter to access, create, and manage content within the same content subject matter categories submitted by other submitters that is classified within the particular content subject matter category to which the access rights provider the submitter access. For example, a first authenticated submitter with access rights to the content subject matter category of computer programming may access, create, and manage content submitted by the first authenticated submitter within this content subject matter category, and may access, create, and manage content submitted by other submitters in the content subject matter category of computer programming. Submitters thus may collaborate on, review, add to, suggest modifications to, submit content to, and/or combinations thereof, content within a particular content subject matter category for which the submitter has access rights. Access rights also may limit or restrict which content subject matter categories and content types to which the submitter may access. Additionally, submitters may rate and/or organize submitted content into other content subject matter categories.

After identifying the authentication status of the submitter as being authenticated or as unauthenticated, the Authentication module 204 may instruct the Communication module 202 to forward an upload webpage for presentation to the submitter at the submitter computer 102. FIG. 2 illustrates an exemplary upload webpage 300 useable by a submitter to upload content, according to an exemplary embodiment of the present invention. The upload webpage 300 may include a Content title field 302 where the submitter may give the content a title. For example, the submitter may give a video the title of "Proper jogging technique" when uploading a video on how to properly and safely jog. The submitter may enter a short description of the content in a Brief summary field 304 on the upload webpage 300 describing what is included in the content.

The submitter also may suggest classification for the content in a content subject matter category within a content classification hierarchy in the Content classification field 306. The classification hierarchy may include many classification levels of content subject matter categories from broadest to narrowest, which may be used for classifying content into a particular content subject matter category within the classification hierarchy. For example, at a broadest level, the classification hierarchy may include two broad content subject matter categories: athletics and pets. Under athletics, the classification may include four narrower content subject matter categories: running, soccer, track, and football. Under pets, the classification hierarchy may include three narrower content subject matter categories: dogs, cats, and fish. Thus, a submitter who submits a video on jogging technique may navigate through the classification hierarchy to classify the video first under the broader content subject matter category of athletics, and then under the narrower content subject matter category of jogging. Additionally, the submitter may suggest a new content subject matter category if the content to be uploaded cannot be readily classified within the classification hierarchy. Other classification hierarchies with one or more classification levels for any number of content subject matter categories may be used. It is noted that if an authenticated submitter abuses privileges accompanying the access rights by intentionally incorrectly classifying content into an improper content subject matter category, the Authentication module 204 may revoke or modify the submitter's access rights and may prevent the submitter from submitting further content.

The submitter may identify the storage location of the content on the submitter computer 102 to be uploaded in the Content location field 310. A Suggested search terms field 308 may permit the user to enter search terms that may permit viewers to find and retrieve the content, if published, using a search engine. For example, a submitter may suggest search terms such as "cardio," "health," "jogging," and "running" for a video on jogging. Submitters who are not authenticated may enter their contact and personal information in the Submitter information field 312. Authenticated submitters may not enter their contact and personal information as the server 108 may have previously obtained this information during registration to obtain the authentication information. The Submitter information field 312 may receive a name, an email address, a telephone number, a pager number, an instant messaging ID, other information useable to contact and/or identify the submitter, and/or combinations thereof.

The Collaboration request field 314 may permit a submitter to request that an approver review the content prior to publication to suggest modifications to improve the content, even if the content may not require approval, as will be discussed in further detail below. Also, the submitter may specify in the Collaboration request field 314 whether viewers of the published content may suggest modifications to improve the content after publication. The submitter additionally may specify in the Collaboration request field 314 whether to interim publish the content to permit viewers of the interim published content to suggest modifications to improve the content before or while the content may be reviewed by an approver.

Once a submitter has entered information in some or all of fields 302-314, the submitter may select an Upload field 316 on the upload webpage 300 to generate an upload message for communicating the content to the server 108 via the network 106. The upload message also may include the information entered in fields 302-314 ("content description data"). It is noted that Hypertext Transfer Protocol (http), file transfer protocol (ftp), eXtensible Markup Language (xml), standard mail (e.g., U.S. mail. etc.), other known techniques for communication, and/or combinations thereof, may be used to forward the content and content description data to the server 108. Standard mail may involve typing, scanning, digitizing, etc., the content description data and/or the content at a computer for entry at the server 108.

The Communication module 202 may receive and may forward the content and the content description data entered at the upload webpage 300 to the Validation module 206 for processing. The Validation module 206 may process the content by identifying a content type of the content, which may indicate the format of the content (e.g., audio, video, a text file, compression technique, protocol, digital, analog, etc.), and by applying content rules based on the content type. For each content type, the Validation module 206 may apply certain content rules for that content type that must be satisfied for the content to be considered a valid submission.

The content rules may specify that the content includes certain information in order to consider the content to be valid. The Validation module 206 may inspect the content and the content description data based on the content rules to verify that together they include sufficient information for identifying and retrieving the content using, for example, a search engine. The Validation module 206 may, for example, inspect the content to identify if the content includes a title and meta data (e.g., suggested search terms, etc.), and is of an appropriate length for the content type of content. The meta data may be information included in the content that is not displayed to the user, but instead may be used by search engines to efficiently retrieve the submitted content. For example, a text article explaining fly fishing techniques may include the words "fishing," "trout," and "casting" as meta data because they may be used in a search to retrieve the content.

The content rules also may specify certain properties of the content for the Validation module 206 in order to consider the content to be valid. For example, the content rules may define a minimum and maximum length for audio content, video content, text content, etc. The length of the content may vary based on the content type. For example, the provider of the system 100 may specify that videos may be no less than 1 minute and no more than 35 minutes long. The content rules also may specify a certain minimum and maximum length for text files. The content rules also may set include restrictions and requirements for other content types.

The content rules additionally may specify that the content identify a source for the content in order to consider the content to be valid. For example, the source may identify who created a document, video, etc., and how the creator may be contacted. The content rules also may require successful completion of a spell-check for the meta data and of any text included in the content description data. The Validation module 206 additionally may examine the text of the content and the content description data, where applicable, to screen out inappropriate material. For example, the Validation module 206 may reject content for publication that is explicit, includes obscenities, and also may reject content based on the subject matter being inappropriate for publication (e.g., developing explosives, violence, etc.) if specified by the provider.

If the content does not pass the validations by failing to pass one or more of the content rules, the Validation module 206 may instruct the Communication module 202 to notify the submitter of a validation failure. For example, the Validation module 206 may process the content as it is being submitted and may either immediately or via sending a message (e.g., email, etc.) notify the submitter of the validation failure. The validation failure may be communicated to the submitter via email, for example, if the content may be submitted in a batch process. After being notified of the validation failure, the submitter may then modify and resubmit the content after correcting the errors, providing required information, by eliminating objectionable subject matter, etc., and/or combinations thereof, so that the resubmitted content complies with the content rules.

After the Validation module 206 determines that the content is valid, the Assignment module 208 may determine whether to assign the content to a queue for review by an approver or to publish the content without any further review. This determination may be at least partially based on the authentication status of the submitter of the content and on the content subject matter category, the country in which the content may be published and viewed, whether the submitter has requested collaboration from an approver prior to publication, and/or combinations thereof. If the content is received from a submitter whose authentication status indicates that the submitter has not been authenticated, then the Assignment module 208 may indicate that the content requires further approval before publication. If the content is received from a submitter who has been authenticated, then the Assignment module 208 may review the content subject matter category of the content prior to publication in its determination of whether to assign the content to a queue for review by an approver or to publish the content without any further review.

The Assignment module 208 may classify the content subject matter category of the received content into one of two content areas: a first content area and a second content area. The first content area may include subject matter that may not need to be reviewed. The first content area may include all subject matter that would rarely result in liability for the provider of the system 100 if published. For example, the first content area may include content subject matter categories such as gardening, dining etiquette, charitable organizations, etc. The second content area may include subject matter that may potentially incur liability by publication without prior review by an expert or experienced professional in the field. For example, the second content area may include content subject matter categories such as medical and legal advice, firearms, archery, etc. It is noted that the content subject matter categories discussed as being included in the first and second content areas are exemplary, and that the exemplary content subject matter categories may be moved from one content area to the other. Other content subject matter categories also may be included in one or the other content areas. Also, the Assignment module 208 may identify the country in which the server 108 operates to determine if approval by a government official is required prior to publication of the content regardless of whether the content may be classified in either the first content area or in the second content area.

If the content is from an authenticated submitter who does not request collaboration, is in the first content area, is in a content subject matter category in which the submitter has access rights to submit, and does not require approval by a government official, the Assignment module 208 may instruct the publication module to publish the content without review by an approver. If the content is (1) from an authenticated submitter who requests collaboration; (2) from an authenticated submitter, is in the first content area, but is not in a content subject matter category to which the submitter is approved to submit; (3) not from an authenticated submitter; or (4) is in the second content area, then the Assignment module 208 may generate a review request and may instruct the Queue module 210 to assign the review request and the associated content to a queue based on the content subject matter category. Assigning the review request to a queue based on the content subject matter category may be used to queue the review request for forwarding a notification message of the pending content for review to an expert or experienced professional to determine the accuracy and/or reliability of the content based on accepted techniques.

Once the review request is assigned to a queue, or reassigned to a queue as discussed in further detail below, the Assignment module 208 may determine whether to interim publish the content. A submitter may request interim publishing of the content to permit viewers to collaborate with the submitter to improve and/or modify the content. An interim publish also may allow the content to be published before the content has acquired all desired information or approval. For example, the provider of the server 108 may ordinarily vet health content by a medical review board and may stamp the health content with their approval before publication, but in the interest of timely content updates for viewers, the server 108 may publish the health content before obtaining approval. Prior to completion of the review, the interim published content may or may not include an indicator that the content has not been reviewed. For example, the interim published content may indicate that the content is being reviewed, but has not yet been approved. However, failure to notify the viewer of the lack of an approval mark may prevent the viewer from attaching undue weight to the fact that the content has not yet been approved. Once reviewed and approved by one or more approvers, an approval mark may be added indicating that the content has been reviewed by an expert, experienced professional, etc., in the field, thus indicating that the approver has reviewed, and possibly verified, the accuracy and reliability of the content.

The Queue module 210 may include one or more queues for each content subject matter category. Multiple queues may include a queue level hierarchy, where lower level individuals may be first queued to review content before incrementing the queue level to queue the content for review by a higher level individual, for example. The number of queues associated with a content subject matter category may correspond to the number of approvers required to approve the content. For example, routine medical information may include two queues, a first queue for review of the content by a nurse, and a second queue for review of the content by a doctor after the nurse has approved the content. More complex medical information may require review additional layers of review. For example, complex medical information included in content may involve review by a nurse, then by a doctor, then by a panel of doctors, and then by a government official. Any number of levels of review may be included in the queue hierarchy depending on the content subject matter category. Each content subject matter category may include at least one queue, and may have as many queues as desired. For a multiple queues associated with a particular content subject matter category, once a lower level approver has approved of the content, the Assignment module 208 may increment a level for the queue within the queue hierarchy, may generate a review request for the incremented level queue, and may instruct the Queue module 210 to queue the review request in the next higher level queue.

Once the review request and the content are queued, the Queue module 210 may instruct the Communication module 202 to forward a notification message including the review request and/or the content to one or more approvers to notify the approver(s) of the pending content to be reviewed. For example, the Communication module 202 may forward an email to each of the reviewers. If multiple approvers are notified and only a single approver is needed, once the first approver accepts the review request, then the Queue module 210 may instruct the Communication module 202 to notify the other approvers that the review is being performed by another approver. To alert the other approvers that they do not have to review the content, the Communication module 202 may send a notification message, such as, for example, an page for a pager, an email, an automated phone call, a text message, other messages to alert an individual, and/or combinations thereof Also, multiple approvers may review the content and the system 100 may wait for approval from one or more of the approvers before publication with the approval mark. Additionally, the system 100 may publish the content after approval by a first approver, and a second approver may revoke the previous approval or comment on the first approver's reasons for approving. The system 100 also may wait for approval of all of the approvers before publishing with the approval mark. The system 100 also may handle other similar scenarios to determine whether to publish with approval and/or remove approval.

The approver may be an entity that has a defined relationship with the provider of the server 108. Approvers may be individuals, employees of a company, professors at a university, practicing professionals, other individuals or groups with a minimum amount of knowledge, skill, and/or education, and/or combinations thereof Approvers may verify the content, add information, reject the content, suggest modifications or improvements to the content, etc., and/or combinations thereof.

Approvers may be authenticated in the manner described above for submitters prior to reviewing and evaluating the submitted content. Approvers also may have access rights that may limit or restrict their access to particular content subject matter categories in which the approver has a minimal level of skill, expertise, experience, etc., such that the approver may access the reliability, accuracy, etc., of the content within that particular content subject matter category.

Once the approver is authenticated, the server 108 may communicate the content to the approver computer 104 via the network 106. For example, the server 108 and the approver computer 104 may communicate using Hypertext Transfer Protocol (http), file transfer protocol (ftp), eXtensible Markup Language (xml), other known techniques for communicating over a network, and/or combinations thereof.

After reviewing the content, the approver may use the approver computer 104 to generate a response message, which may be forwarded to the server 108 via the network 106. The response message may include data: (1) indicating whether the approver approves of the content, (2) added by the reviewer, (3) suggesting modifications or improvements to the content before the approver may approve the content, (4) requesting a second (or third, and so forth) review request for queuing the content in another queue for review by another approver, and/or combinations thereof For example, the approver may input comments at the approver computer 104 in an approver webpage hosted by the server 108. Once the comments are completed, the approver may select a completed field to instruct the approver computer 104 to generate and forward the response message containing the completed comments to the server 108.

During the review, the approver may add various types of information to the content. The added information may relate to improving the searchability of the content and/or to improving the quality of the content. For example, the approver may add additional search keywords for search engines, may annotate the content, may correct any obvious errors (e.g. typographical errors, etc.), may reclassify the content to a different content subject matter category within the classification hierarchy, may classify the content into one or more additional content subject matter categories within the classification hierarchy, etc. The approver also may improve the quality of the content by adding background information to the content to further explain the content. For example, the approver may cite articles, include links to other related content, may include definitions of key terms, etc. The approver also may include advertiser data in the response message identifying potential advertisers who may wish to advertise within the content subject matter category of the content. The approver also may add transcripts of audio and/or video.

If the approver rejects the content, the response message may include rejection data rejecting the content and may also include in the rejection data comments that indicate a reason for the rejection, which the server 108 may forward to the submitter computer 102. The reason may be, for example, that more information is required in the content or that the content is not appropriate for publication by the server 108. Other reasons also may be given that are appropriate for the content. The submitter may then resubmit modified content that complies with the approver's comments, if desired, and the Assignment module 208 may assign the resubmitted content to the queue associated with the approver for a subsequent review. The submitter also may appeal the rejection by sending an appeal request message from the submitter computer 102 to the server 108 requesting that the content be reviewed by a panel of one or more approvers. For the appeal, the Assignment module 208 may instruct the Queue module 210 to assign the appealed content to the queue associated with the panel for that content subject matter category. If the submitter does not resubmit modified content or contend the rejection, then the server 108 may delete the content after a time interval has elapsed.

After an approver approves the content and sends a response message to the server 108 containing approval data, the Assignment module 208 may determine whether the content needs additional approval and/or information prior to receiving an approval mark. The Assignment module 208 may determine that the content requires additional approval based on the number of queues associated with the content subject matter category. For example, multiple approvers may be required to review the content prior to receiving an approval mark for the content within a particular content subject matter category. The response message also may specify that the content may be forwarded to an expert in the field for adding additional information to the content and/or for further review prior to receiving an approval mark for the content. If the content needs additional approval and/or additional information from another approver, then the Assignment module 208 may assign the content to the next queue in the queue hierarchy associated with the content subject matter category for further approval of the content to permit experts and/or other approvers to review, add to, modify, etc., and/or combinations thereof, the content. If the content does not need any further approval and/or additional information, then the Assignment module 208 may instruct the Publication module 212 to publish the content with the approval mark.

The Publication module 212 may publish the content by permitting a viewer at the viewer computer 110 to access the content from the server 108. For example, the Publication module 212 may publish the content by including a link to the content on a webpage hosted by the server 108, by making the content searchable via a search engine, other known manners of permitting a device to access a server via a network, etc., and/or combinations thereof A viewer may, for example, use a web browser at the viewer computers 110 to select the link to access the published content. The webpage may, for example, include the approval mark indicating that the content has been reviewed and approved in a location that is viewable using a web browser. Additionally, the server 108 may process searches generated by a search engine from keywords input at the viewer computer 110 to search the published content that is stored on the server 108 (or on another device associated with the server 108) based on the meta data associated with the content. Publishing also may occur in a traditional sense where the Publication module 212 may instruct paper presses to generate a paper publication after a certain amount of approved content is added.

After publication of the content, the submitter may submit modifications to and/or remove the content from the server 108 that was previously submitted by the submitter. For example, the submitter may discover inaccuracies in a previously published video and may decide to remove and/or modify the video. Additionally, a website hosted by the server 108 may include a link soliciting viewers (including submitters and approvers) to comment on the published content. The website may include a space for commentary (e.g., a blog) by the submitter, the approver, the viewers, and/or combinations thereof Also, the website may include a link to contact information permitting viewers to forward supplementary information to the submitter to potentially add to the published content. The website additionally may include real-time communication features (e.g., an online chat room) permitting the submitter to communicate with other viewers to discuss the content. Hence, the submitter may collaborate with other viewers to identify subject matter to improve, augment, modify, etc., the published content. Any newly submitted content may proceed through the validation and approval process, as discussed above.

Figure 4:
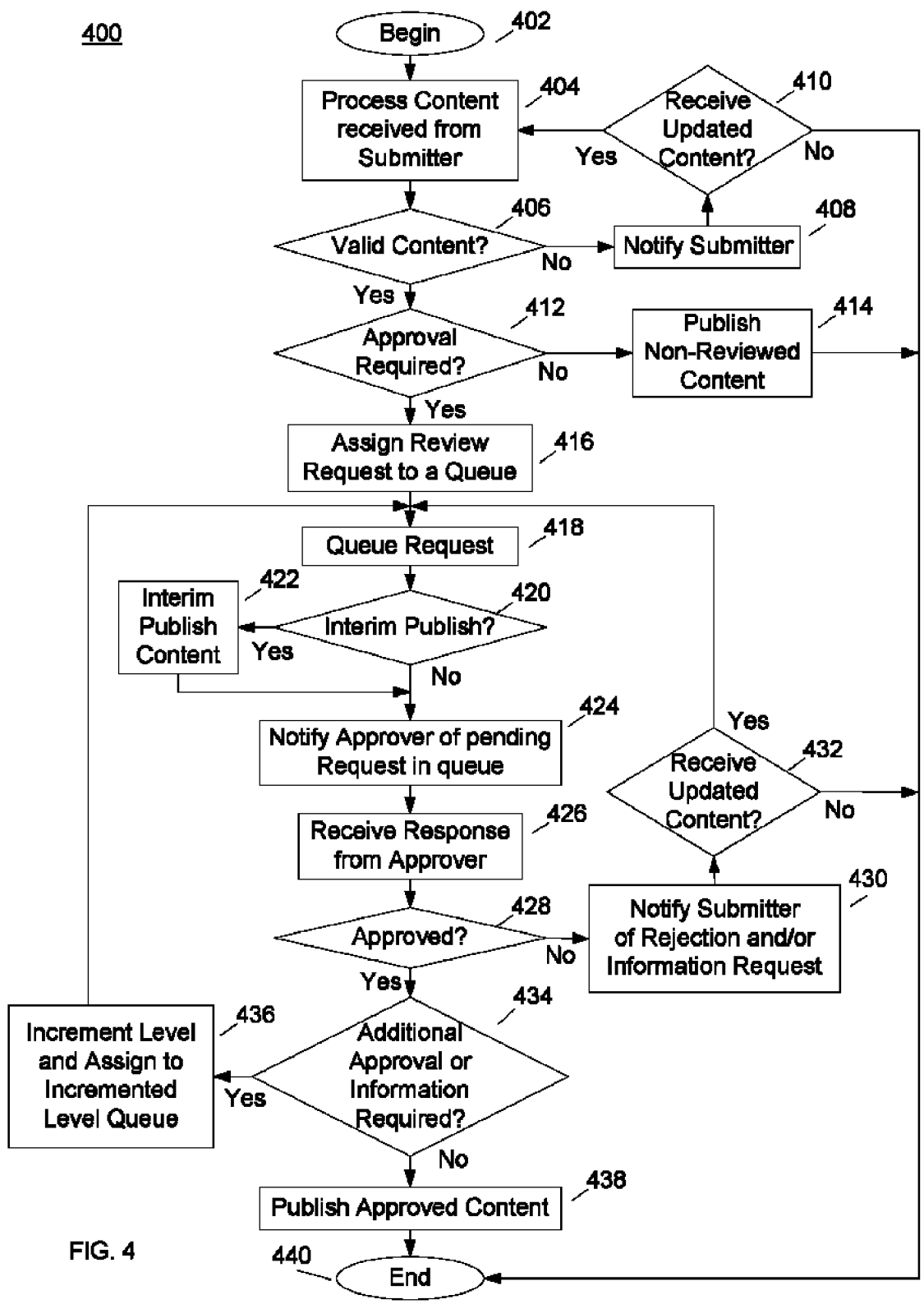
FIG. 4 illustrates an exemplary flow diagram for processing content and for determining whether to publish the content, according to an exemplary embodiment of the present invention.

FIG. 4 illustrates a flow diagram 400 of a process for determining whether to publish received content, according to an exemplary embodiment of the present invention. The flow diagram 400 may begin at 402 and may continue to 404.

In 404, the Communication module 202 of the server 108 may receive content from a submitting computer 102 via network 106, and the Validation module 206 may process the content based on a content type and content rules associated with the content type.

In 406, the Validation module 206 may determine whether the received content satisfies the content rules associated with the content type of the received content. If satisfied, then the flow diagram 400 may continue to 412. If not satisfied, then the flow diagram 400 may continue to 408.

In 408, the Validation module 206 may generate and instruct the Communication module 202 to forward a notification message to the submitter computer 102 to notify the submitter of the validation failure.

In 410, the Communication module 202 may determine whether the submitter has resubmitted content, which may correct the errors that caused the validation failure, within a particular time interval. If not received within the time interval, the flow diagram 400 may continue to 440 and end. If received within the time interval, the flow diagram 400 may continue to 404.

In 412, the Assignment module 208 may determine whether the content requires review by an approver prior to publication. If the content is received from an authenticated submitter within a content subject matter category to which the submitter is permitted to submit, the content falls within the first content area, as discussed above, the submitter has not requested collaboration, and the publication of the content does not involve governmental approval, then the flow diagram 400 may continue to 414. Otherwise, the content may be queued for review by an approver and the flow diagram 400 may continue to 416.

In 414, the Publication module 212 may publish the non-reviewed content. The published non-reviewed content may or may not include an indicator indicating that the content has not been reviewed. The flow diagram 400 may then continue to 440 and end.

In 416, the Assignment module 208 may generate a review request and may instruct the Queue module 210 to assign the review request and the associated content to a queue based on the content subject matter category of the content.

In 418, the Queue module 210 may receive and assign the review request to a queue as instructed by the Assignment module 208.

In 420, the Assignment module 208 may determine whether to interim publish the content. If yes, the flow diagram 400 may continue to 422. If no, then the flow diagram 400 may continue to 424.

In 422, the Assignment module 208 may instruct the Publication module 212 to publish the content, which may or may not include an indicator indicating that the content is pending review and has not yet been approved.

In 424, the Queue module 210 may instruct the Communication module 202 to generate a notification message to notify one or more approvers of the pending review request. Upon receipt of the notification message, the approver computer(s) 104 receiving the notification message may access the content from the server 108 via the network 106 for review.

In 426, the Communication module 202 may receive a response message from one or more of the approver computers 104 and may forward the response message to the Assignment module 208. The response message may approve of the content, reject the content, request additional information from the submitter, include a second (or subsequent) review request requesting review of the content by another approver, etc., and/or combinations thereof.

In 428, the Assignment module 208 may receive the response message from the Communication module 202 and may process the response message to determine whether the approver approved of the content. If approved, the flow diagram 400 may continue to 434. If not approved, the approver requested additional information, or both, the flow diagram 400 may continue to 430.

In 430, the Assignment module 208 may instruct the Communication module 202 to generate a notification message to notify the submitter of the rejection and/or of the request for additional information.

In 432, the Communication module 202 may determine whether updated content is received from the submitter within a predetermined time interval. If not received, the flow diagram 400 may continue to 440 and end. If received, the Communication module 202 may forward the updated content to the Assignment module 208, which may generate a new review request and may instruct the Queue module 210 to queue the new review request to obtain a subsequent review by the approver. The flow diagram 400 may continue to 418.

In 434, the Assignment module 208 may determine whether additional approval and/or information is required for the content. Additional approval may be based on the content subject matter category of the content or on a request for additional approval included in the response message. For example, certain content subject matter categories may include a queue hierarchy for review by multiple levels of approvers (e.g., nurse, doctor, panel of doctors, etc.). If specified, the flow diagram 400 may continue to 436. If not specified, the flow diagram 400 may continue to 438.

In 436, the Assignment module 208 may increment a review level within the queue hierarchy and may generate a second (or subsequent) review request. The Assignment module 208 may instruct the Queue module 210 to queue the second (or subsequent) review request in the next higher review level queue associated with the content subject matter category. The flow diagram 400 may then continue to 418.

In 438, the Assignment module 208 may instruct the Publication module 212 to publish the content to permit the server 108 to be accessed for the content. The approved content may included an associated approval mark. The flow diagram 400 may continue to 440 and end.

The following provides a Non-Reviewed content publishing example according to exemplary embodiments of the present invention. In this example, a submitter desires to upload a 15 minute training video on how to teach a dog to roll over. After creating and storing the video on the submitter computer 102, the submitter accesses a website hosted by the server 108. The submitter previously registered with the server 108, and communicates authentication information to the server 108 to authenticate the submitter. The Authentication module 204 of the server 108 then authenticates the submitter based on the authentication information. The Authentication module 204 may determine that the submitter has access rights to the content subject matter categories of pet training, pet care, and pet grooming within the classification hierarchy based on the received authentication information. Thereafter, the submitter creates a title, a short description of the video, and search keywords for identifying the video. The submitter also identifies the storage location of the video on the submitter computer 102 and selects the content subject matter category as being "pet training," but does not request collaboration. Thereafter, the submitter uploads the video along with the content description data in an upload message that is communicated from the submitter computer 102 to the server 108 via the network 106.

Once the video is received via the network 106, the Validation module 206 identifies that the submitter has uploaded content, and that the content type is video. The Validation module 206 processes the content description data submitted along with the video to verify that the video satisfies the content rules associated with the content type (i.e., content rules for video).

In this example, the Validation module 206 may determine that the 15 minute video and the content description data satisfy all of the requirements of the content rules for video content.

The Assignment module 208 may then process the video to determine whether the content subject matter category of "pet training" requires review by an approver. Based on the content description data submitted along with the video, on the authentication status of the submitter, and on the content subject matter category of "pet training" being within the first content area, the Assignment module 208 may determine that no further review of the video is required before publication.

The Assignment module 208 may then instruct the Publication module 212 to publish the video. For example, the Publication module 212 may publish the video by including a link to the video under the content subject matter category of "pet training" and also may make the keywords associated with the video searchable using search engines.

The following provides an Approved content publishing example according to exemplary embodiments of the present invention. In this example, a submitter desires to upload a recipe for individuals who have diabetes. After creating and storing a text file of the recipe on the submitter computer 102, the submitter accesses a website hosted by the server 108. In this instance, the submitter has not previously registered with the server 108, and does not have any authentication information. Because the submitter does not submit any authentication information, the Authentication module 204 of the server 108 identifies the content as being submitted from an unauthenticated submitter. The submitter then creates a title, a short description of the text file, search keywords for identifying the text file, selects a content subject matter category of "recipes" for the text file, and identifies the storage location of the text file on the submitter computer 102. Thereafter, the submitter uploads the text file along with the content description data to the server 108 in an upload message.

Once the text file and the content description data are received, the Validation module 206 identifies that the submitter has uploaded content and that the content type is a text file. The Validation module 206 processes the content description data to verify that the text file satisfies the content rules for text files. In this example, the Validation module 206 may determine that the text file satisfies all of the requirements of the content rules for text files.

The Assignment module 208 may then process the text file to determine whether to forward the text file to an approver for further review. Because the content is received from an unauthenticated submitter, the Assignment module 208 indicates that the text file requires further review before publication. The Assignment module 208 may generate a review request and may instruct the Queue module 210 to queue the review request and the associated content in a recipe queue. The Assignment module 208 also may determine not to interim publish the recipe until being reviewed because the recipe is received from an unauthenticated submitter.

After queuing the review request, the Queue module 208 may instruct the Communication module 202 to notify one or more approvers of the pending review request. After being accepted by one or more approvers, the approver(s) may access the content from the server 108 and may review the content. The approver may examine the recipe for accuracy, reliability, validity, etc. For example, the approver may determine whether the recipe is suitable for someone managing their diet because of diabetes. In this instance, the approver determines that the recipe is acceptable, but also adds information classifying the recipe in the content subject matter subcategory of "diabetes recipes" within the content subject matter category of diabetes, in addition to classifying the content under recipes, and adds several links to other recipes for individuals who have diabetes. Thereafter, the approver may forward a response message having approval data approving of the recipe and also including the additional information. The response message may further indicate in the approval data that additional approval is necessary and/or desired from another approver, and may include instructions in the response message for instructing the Assignment module 208 to create a new review request to obtain approval from an expert dietitian who specializes in diabetes. After the recipe is approved and the approver(s) have added any additional information to the content, the Assignment module 208 may instruct the Publication module 212 to publish the recipe with an associated approval mark.

Thus, the system 100 may permit management, submission, augmentation, and approval of content prior to and after publication of the content by a group of submitters and approvers who may or may not be physically located together. The process of analyzing the content prior to publication permits the system 100 to review the data to ensure its reliability, while also allowing collaboration between submitters and approvers. Thus, the system 100 may improve the quality and reliability of the content and may gain the confidence of advertisers and viewers who access the content published by the system 100.

The exemplary embodiments of the present inventions are not to be limited in scope by the specific embodiments described herein. For example, although many of the embodiments disclosed herein have been described with reference to methods and systems for managing content submission and publication of content, the principles herein are equally applicable to other aspects of methods and systems. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A computer-implemented method operating on a computer system comprising:
   receiving content from a submitter for publication in an electronic format;
   determining an authentication status of the submitter of the content;
   determining automatically whether the content submitted should be reviewed prior to publication based on at least the authentication status of the submitter and a content subject matter category;
   if review is determined, creating a review request for the content;
   determining a total amount of reviewers needed to approve the content for publication based on the content subject matter category of the content, wherein the total amount of reviewers needed to approve the content for publication is determined based on a queue level hierarchy that comprises a plurality of levels of review, wherein a first level of the plurality of levels of review comprises a first amount of reviewers and a second level of the plurality of levels of review comprises a second amount of reviewers, and wherein the total amount of reviewers at least comprises the sum of the first amount and the second amount;
   assigning the review request to a plurality of queues based on the content subject matter category of the content and the total amount of reviewers needed to approve the content for publication;
   notifying a plurality of potential reviewers that the review request is pending in the plurality of queues by transmitting a plurality of notification messages that indicate that the review request is pending to the plurality of potential reviewers;
   providing access to the content via a network for review by a reviewer;
   determining whether to interim publish the content by temporarily publishing the content before receiving a response message to a notification message based on the content subject matter category of the content;
   processing the response message to the notification message, the response message indicating a reviewer's review; and
   determining whether to publish the content based on the response message.

2. The computer-implemented method of claim 1, wherein the response message comprises approval data indicating approval of the content.

3. The computer-implemented method of claim 1, wherein the response message comprises approval data that adds information to the content.

4. The computer-implemented method of claim 1, wherein the response message comprises rejection data that precludes publication of the content.

5. The computer-implemented method of claim 4, wherein the rejection data comprises suggestion information to suggest modifications to the content to obtain approval for publication of the content.

6. The computer-implemented method of claim 1, wherein the response message comprises an additional information request to request additional data be added to the content.

7. The computer-implemented method of claim 1, wherein the response message comprises an additional approval request to request additional approval of the content.

8. The computer-implemented method of claim 7, further comprising:
   generating a second review request based on the additional approval request; and
   assigning the second review request to a sec-end queue in the plurality of queues associated with the content subject matter category.

9. The computer-implemented method of claim 1, wherein the content subject matter category comprises a classification of the content within a content classification hierarchy.

10. The computer-implemented method of claim 1, further comprising identifying a content type that indicates a data format of the content.

11. A computer readable media comprising code to perform the acts of:
    receiving content from a submitter for publication in an electronic format;
    determining an authentication status of the submitter of the content;
    determining automatically whether the content submitted should be reviewed prior to publication based on at least the authentication status of the submitter and a content subject matter category;
    if review is determined, creating a review request for the content;
    determining a total amount of reviewers needed to approve the content for publication based on the content subject matter category of the content, wherein the total amount of reviewers needed to approve the content for publication is determined based on a queue level hierarchy that comprises a plurality of levels of review, wherein a first level of the plurality of levels of review comprises a first amount of reviewers and a second level of the plurality of levels of review comprises a second amount of reviewers, and wherein the total amount of reviewers at least comprises the sum of the first amount and the second amount;

assigning the review request to a plurality of queues based on the content subject matter category of the content and the total amount of reviewers needed to approve the content for publication;

notifying a plurality of potential reviewers that the review request is pending in the plurality of queues by transmitting a plurality of notification messages that indicate that the review request is pending to the plurality of potential reviewers;

providing access to the content via a network for review by a reviewer;

determining whether to interim publish the content by temporarily publishing the content before receiving a response message to a notification message based on the content subject matter category of the content;

processing the response message to the notification message, the response message indicating a reviewer's review; and determining whether to publish the content based on the response message.

12. A method comprising:

processing content received via a network;

identifying a content type and a content subject matter category of the content;

validating the content based on content rules associated with the content type;

determining automatically whether to assign the content to a queue to request review of the content or to publish the content without review based on the content subject matter category and an authentication status of a submitter of the content;

if review is determined, creating a review request for the content;

determining a total amount of reviewers needed to approve the content for publication based on the content subject matter category of the content, wherein the total amount of reviewers needed to approve the content for publication is determined based on a queue level hierarchy that comprises a plurality of levels of review, wherein a first level of the plurality of levels of review comprises a first amount of reviewers and a second level of the plurality of levels of review comprises a second amount of reviewers, and wherein the total amount of reviewers at least comprises the sum of the first amount and the second amount; and assigning the review request to a plurality of queues based on the content subject matter category of the content and the total amount of reviewers needed to approve the content for publication.

13. A computer readable media comprising code to perform the acts of:

processing content received via a network;

identifying a content type and a content subject matter category of the content;

validating the content based on content rules associated with the content type;

determining automatically whether to assign the content to a queue to request review of the content or to publish the content without review based on the content subject matter category and an authentication status of a submitter of the content;

if review is determined, creating a review request for the content;

determining a total amount of reviewers needed to approve the content for publication based on the content subject matter category of the content, wherein the total amount of reviewers needed to approve the content for publication is determined based on a queue level hierarchy that comprises a plurality of levels of review, wherein a first level of the plurality of levels of review comprises a first amount of reviewers and a second level of the plurality of levels of review comprises a second amount of reviewers, and wherein the total amount of reviewers at least comprises the sum of the first amount and the second amount; and assigning the review request to a plurality of queues based on the content subject matter category of the content and the total amount of reviewers needed to approve the content for publication.

14. A system comprising:

a first computing device communicatively coupled to a network, the first computing device communicating content via the network;

a server communicatively coupled to the network, the server receiving the content communicated from a submitter for publication in an electronic format via the network, identifying a content subject matter category of the content; determining an authentication status of the submitter of the content; determining automatically whether the content submitted should be reviewed prior to publication based on at least the authentication status of the submitter and the content subject matter category; if review is determined, creating a review request for the content; determining a total amount of reviewers needed to approve the content for publication based on the content subject matter category of the content, wherein the total amount of reviewers needed to approve the content for publication is determined based on a queue level hierarchy that comprises a plurality of levels of review, wherein a first level of the plurality of levels of review comprises a first amount of reviewers and a second level of the plurality of levels of review comprises a second amount of reviewers, and wherein the total amount of reviewers at least comprises the sum of the first amount and the second amount; assigning the review request to a plurality of queues based on the content subject matter category and the total amount of reviewers needed to approve the content for publication; notifying a plurality of potential reviewers that the review request is pending in the plurality of queues by transmitting a plurality of notification messages that indicate that the review request is pending to the plurality of potential reviewers; and transmitting the plurality of notification messages via the network; and a second computing device communicatively coupled to the network, the second computing device receiving at least one notification message via the network, accessing the content via the network for review by a reviewer, and transmitting a response message to the received notification message via the network, the response message indicating a reviewer's review, wherein the server determines whether to interim publish the content by temporarily publishing the content before receiving the response message based on the content subject matter category of the content and determines whether to publish the content based on the response message.

15. A system comprising:

a means for receiving content from a submitter for publication in an electronic format;

a means for determining an authentication status of the submitter of the content;

a means for determining automatically whether the content submitted should be reviewed prior to publication based on at least the authentication status of the submitter and a content subject matter category;

if review is determined, a means for creating a review request for the content;

a means for determining a total amount of reviewers needed to approve the content for publication based on the content subject matter category of the content, wherein the total amount of reviewers needed to approve the content for publication is determined based on a queue level hierarchy that comprises a plurality of levels of review, wherein a first level of the plurality of levels of review comprises a first amount of reviewers and a second level of the plurality of levels of review comprises a second amount of reviewers, and wherein the total amount of reviewers at least comprises the sum of the first amount and the second amount;

a means for assigning the review request to a plurality of queues based on the content subject matter category of the content and the total amount of reviewers needed to approve the content for publication;

a means for notifying a plurality of potential reviewers that the review request is pending in the plurality of queues by transmitting a plurality of notification messages that indicate that the review request is pending to the plurality of potential reviewers;

a means for providing access to the content via a network for review by a reviewer;

a means for determining whether to interim publish the content by temporarily publishing the content before receiving a response message to a notification message based on the content subject matter category of the content;

a means for processing the response message to the notification message, the response message indicating a reviewer's review; and a means for determining whether to publish the content based on the response message.

16. A system comprising:

a communication module operating on a processor configured to communicate via a network, the communication module being configured to receive content and content description data via the network;

an authentication module operating on a processor configured to be communicatively coupled to the communication module, the authentication module being configured to query the communication module to determine whether the communication module received authentication information via the network;

a validation module operating on a processor configured to be communicatively coupled to the communication module, the validation module being configured to process the content and the content description data to identify a content type and content rules associated with the content type, and to determine whether the content and the content description data are valid based on the content rules; and an assignment module operating on a processor configured to be communicatively coupled to the validation module, wherein if the validation module finds the content and the content description data valid, the assignment module is configured to determine automatically whether to assign a review request to a queue based on at least an authentication status of a submitter of content or to generate a publish instruction, wherein if review is determined, the assignment module is configured to determine a total amount of reviewers needed to approve the content for publication based on the content subject matter category of the content, wherein the total amount of reviewers needed to approve the content for publication is determined based on a queue level hierarchy that comprises a plurality of levels of review, wherein a first level of the plurality of levels of review comprises a first amount of reviewers and a second level of the plurality of levels of review comprises a second amount of reviewers, and wherein the total amount of reviewers at least comprises the sum of the first amount and the second amount and to assign the review request to a plurality of queues based on the content subject matter category of the content and the total amount of reviewers needed to approve the content for publication.

17. The system of claim 16, wherein the authentication module is configured to determine that the content is from an unauthenticated submitter if the communication module has not received authentication information.

18. The system of claim 16, wherein the authentication module is configured to authenticate the authentication information and determine access rights based on the authentication information if the communication module has received the authentication information via the network.

19. The system of claim 18, wherein the assignment module is configured to generate the review request if the content is classified in a content subject matter category outside of the access rights.

20. The system of claim 18, further comprising a publication module operating on a processor configured to be communicatively coupled to the assignment module, the publication module being configured to publish the content upon receiving the publication instruction.

21. The system of claim 20, wherein the assignment module is configured to generate the publish instruction for instructing the publication module to publish the content if permitted by the access rights.

22. The system of claim 21, wherein publishing the content makes the content accessible via the network.

23. The computer-implemented method of claim 1, wherein the amount of reviewers needed to approve the content for publication is one.

24. The computer readable media of claim 11, wherein the amount of reviewers needed to approve the content for publication is one.

25. The method of claim 12, wherein the amount of reviewers needed to approve the content for publication is one.

26. The computer readable media of claim 13, wherein the amount of reviewers needed to approve the content for publication is one.

27. The system of claim 14, wherein the amount of reviewers needed to approve the content for publication is one.

28. The system of claim 15, wherein the amount of reviewers needed to approve the content for publication is one.

29. The system of claim 16, wherein the amount of reviewers needed to approve the content for publication is one.

* * * * *